United States Patent [19]

Jacob

[11] 4,204,954

[45] May 27, 1980

[54] DETOXIFICATION OF RESIDUAL QUATERNARIES

[75] Inventor: Jose T. Jacob, Lake Zurich, Ill.

[73] Assignee: Chemed Corporation, Cincinnati, Ohio

[21] Appl. No.: 47,186

[22] Filed: Jun. 8, 1979

Related U.S. Application Data

[63] Continuation of Ser. No. 929,981, Aug. 1, 1978, abandoned.

[51] Int. Cl.$^2$ ............................................... C02C 5/02
[52] U.S. Cl. ....................................... 210/59; 424/329
[58] Field of Search ...................... 210/54, 62, 64, 59; 424/329

[56] References Cited

U.S. PATENT DOCUMENTS

| | | | |
|---|---|---|---|
| 2,692,231 | 10/1954 | Stayner et al. ........................ | 210/62 |
| 3,130,124 | 4/1964 | Ferris et al. ........................ | 210/64 X |
| 3,296,069 | 1/1967 | Kowalski ........................... | 210/64 X |
| 3,524,812 | 8/1970 | Shema et al. ....................... | 210/64 X |
| 3,553,141 | 1/1971 | Katsumi et al. ................ | 424/329 X |
| 3,560,390 | 2/1971 | Gaines ............................. | 424/329 X |
| 4,010,252 | 3/1977 | Hewitt ............................. | 424/347 X |

OTHER PUBLICATIONS

Walter et al., "Antibacterial Activity of Mixtures of Quaternary Ammonium Compounds and Hexachlorophene", *Jour. of Pharm. Sci.*, vol. 51, No. 8, Aug. 1962, pp. 770–772.

*Primary Examiner*—Thomas G. Wyse
*Attorney, Agent, or Firm*—Charles L. Harness

[57] ABSTRACT

Detoxification of residues of quaternary ammonium salt biocides in water, using neutralizing amounts of anionic monomers.

4 Claims, No Drawings

DETOXIFICATION OF RESIDUAL QUATERNARIES

This is a continuation of application Ser. No. 929,981, filed Aug. 1, 1978, abandoned.

Several quaternaries are being used at the present time as biocides for the control of microbiological growth in aqueous systems. The residual quaternaries when discharged into waste streams will interfere in the biological treatment processes by inhibiting the growth of biomass. Now it has been discovered that the toxic effect of the residual quaternary compounds can be removed by treating the aqueous solutions containing quaternary compounds with anionic substances. The treated quaternary is found to be non-toxic to bacterial culture; thus it will not interfere in, e.g., activated sludge systems.

Thus, an object of this invention is to detoxify the residual quaternaries present in aqueous solutions before they are discharged into waste streams. Therefore, the purpose of this invention is to use anionics to neutralize the activity of the quaternaries by forming stable complexes with active sites of the quaternaries to render them inactive towards aquatic life.

Specifically, sodium dioctyl sulfosuccinate was used as neutralizing agent for n-alkyl dimethyl benzyl ammonium chloride (Q-salt) which is used as a biocide:

"Q Salt" is 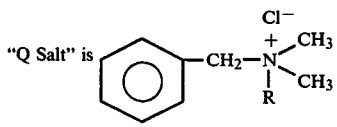

where R represents a long hydrocarbon chain derived from fatty acid. Thus "R" groups may be octyl, decyl, dodecyl, tetradecyl, hexadecyl, actadecyl, octadecenyl, octadecadienyl or a mixture of alkyl groups ranging from:

$C_{12}H_{17}$ to $C_{18}H_{37}$

EXAMPLE 1

Experiments were conducted in an 18 liter glass tank containing a synthetic cooling water having 135 ppm $CaCl_2$, 341 ppm NaCl, 185 ppm $NaHCO_3$, 519 ppm $MgSO_4 7H_2O$ and 444 ppm $CaSO_4.2H_2O$. The Q salt to be tested was weighed and added to the tank so that it could be mixed thoroughly as the solution was brought up to the final temperature. Mixing and heating were accomplished with a combination circulating pump and high quality thermostat which maintained the bath at a constant temperature of 100° F.

Results were monitored by the use of a colorimetric method in which the quaternary was complexed with bromophenol blue and extracted with ethylene chloride and read at 610 mµ using a Beckman DK-2 Spectrophotometer.

After approximately 30 minutes, the first sample from the tank was extracted, the detoxifying agent [sodium dioctyl sulfosuccinate (SDS)] was added. The time noted for extraction began with t=o, the time of addition of the "detoxicant". Extractions were made hourly.

The results are given in Tables 1 and 2. From the Table 1, it is indicated that SDS is very effective for removing the Q salt in an aqueous system within an hour. Table 2 shows the stability of Q salt over a period of time in aqueous solution.

To check the non-toxic behavior of the treated water, few experiments were conducted with Q salt and a combination of Q salt and SDS against a mixed bacterial culture. Results are given in Table 3.

Results after an incubation period of 24 hours showed Q salt inhibited the growth of bacteria at 25 ppm at pH 7 and 8.5 In the presence of SDS, their bacterial activity was destroyed.

TABLE 1

Inactivation of Q Salt With Sodium Dioctyl Sulfosuccinate (SDS)
Conditions: 25 ppm Active Q Salt Is Used With Each Test
Temperature is Maintained At 100° F.

| Neutralizing Chemical Used | Conc. of Neutralizing Agent, ppm | pH | % Removal of Q Salt Time in Hours | | | | |
|---|---|---|---|---|---|---|---|
| | | | 1 | 2 | 3 | 4 | 5 |
| SDS | 15 | 6.7 | 60 | 60 | 60 | 60 | 60 |
| SDS | 30 | 6.7 | 100 | 100 | 100 | 100 | — |
| SDS | 60 | 6.7 | 100 | 100 | 100 | — | — |

TABLE 2

Stability of Q salt in Aqueous Solution at 100° F.
Condition: 50 ppm Active Q Salt is Used For Each Test

| Concentration of Q Salt taken | pH | Concentration of Q Salt Found Time in Hours | | | | |
|---|---|---|---|---|---|---|
| | | 1 | 4 | 8 | 24 | 30 |
| 25 | 6.7 | 25 | 25 | 25 | 25 | 25 |

TABLE 3

Evaluation of Sodium Dioctyl Sulfosuccinate (SDS) with n-Alkyl Dimethyl Benzyl Ammonium Chloride (Q Salt) Against Mixed Bacterial Culture

| Compound | pH | Concentration in ppm | Growth |
|---|---|---|---|
| Q Salt | 7.5 | 3 | ⊕ |
| | | 6 | — |
| | | 13 | — |
| | | 19 | — |
| | | 25 | — |
| Q Salt | 8.5 | 3–25 | — |
| SDS | 7.5 | 2–40 | + |
| SDS | 8.5 | 2–40 | + |
| Q Salt & SDS | 7.5 | 3 + 4 | + |
| | | 6 + 8.5 | + |
| | | 13 + 17.0 | + |
| | | 19 + 27.0 | + |
| | | 25 + 34.5 | + |

⊕Scant Growth≠—No Growth
+Growth
Note: The mixed bacterial culture consisted of *A. Aerogenes, B. Mycoides, E. Coli* and *Psendomonas aeruginosa.*

Residues of the following quaternary ammonium salts can be detoxified by the process of this invention:
Cetyl trimethyl ammonium bromide
Cetyl pyridinium chloride
Dioctyl dimethyl ammonium chloride
Alkyldimethyl dichlorobenzyl ammonium chloride
Alkyl dimethyl ethylbenzyl ammonium chloride
N,N-cetyl ethyl morpholinium ethosulfate 2-(N-decyl-N,N dimethyl amino) acetate 2-(N-coco-N,N dimethyl amino) acetate 2-(N-stearyl-N,N dimethyl amino) acetate In addition to the anionic monomer of Example 1, other useful anionic monomers include:
Sodium stearate
Sodium dodecyl sulfate Dodecyl glycine
Dodecyl amino ethyl glycine
Sodium laurate
Sodium palmitate
Sodium oleate
Sodium linoleate Suitably, 0.3 to 600 ppm of anionic monomer is added to water containing 0.2 to 500 ppm of quaternary, and a gravimetric excess of anionic over quaternary is preferred.

I claim:

1. The method of detoxifying water containing residual toxic amounts of a biocidal quaternary ammonium salt that comprises adding thereto at least a neutralizing amount of an anionic substance, sufficient to provide 0.3 to 600 ppm thereof in the water, followed by discharge into a waste stream, the quaternary being thereby rendered inactive to aquatic life; said anionic substance being a member selected from the group consisting of sodium stearate, sodium dodecyl sulfate, dodecyl glycine, dodecyl amino ethyl glycine, sodium palmitate, sodium oleate, sodium linoleate, or sodium dioctyl sulfosuccinate.

2. Method according to claim 1 in which the quaternary is an n-alkyl dimethyl benzyl ammonium chloride, in which alkyl has 12–18 carbons, including mixes.

3. Method according to claim 2 in which the anionic monomer is sodium dioctyl sulfosuccinate.

4. Method according to claim 1 in which 0.2 to 500 ppm of the quaternary is present in the water.

* * * * *